United States Patent [19]

Nishikawa et al.

[11] Patent Number: 4,969,295

[45] Date of Patent: Nov. 13, 1990

[54] DOOR STRUCTURE OF VEHICLE

[75] Inventors: Ikuo Nishikawa, Higashi-Hiroshima; Chikashi Kawamoto, Hiroshima; Shigeharu Yokoyama, Aki; Noboru Shono, Hiroshima, all of Japan

[73] Assignee: Mazda Motor Corporation, Hiroshima, Japan

[21] Appl. No.: 390,872

[22] Filed: Aug. 8, 1989

[30] Foreign Application Priority Data

Aug. 8, 1988 [JP] Japan ................. 63-198528

[51] Int. Cl.$^5$ ............................................. B60J 5/04
[52] U.S. Cl. ........................................ 49/502; 49/374; 49/441; 296/146; 296/201
[58] Field of Search .................... 49/502, 374-378, 49/440, 441; 296/146, 201

[56] References Cited

U.S. PATENT DOCUMENTS

| | | | |
|---|---|---|---|
| 4,240,227 | 12/1980 | Hasler et al. | 49/348 |
| 4,431,167 | 2/1984 | Watanuki | 49/502 |
| 4,605,260 | 8/1986 | Sakakibara et al. | 49/502 X |
| 4,649,668 | 3/1987 | Skillen et al. | 49/502 X |
| 4,649,669 | 3/1987 | Okamoto et al. | 49/374 X |
| 4,694,611 | 9/1987 | Okumura | 49/502 X |
| 4,702,040 | 10/1987 | Hellriegel | 49/502 |
| 4,747,232 | 5/1988 | Stephenson et al. | 49/502 X |
| 4,783,931 | 11/1988 | Kirkwood | 49/441 |

FOREIGN PATENT DOCUMENTS

| | | |
|---|---|---|
| 60-92614 | 6/1985 | Japan . |
| 60-114012 | 8/1985 | Japan . |
| 60-151718 | 10/1985 | Japan . |

Primary Examiner—Philip C. Kannan
Attorney, Agent, or Firm—Wenderoth, Lind & Ponack

[57] ABSTRACT

The present invention is drawn to a door body of a car capable of opening and closing in which a sash is provided at the upper portion of the door body to form a window space, a door window is provided to be movable in the vertical direction on the door sash, and a corner portion is defined by the door sash and the door body at the front end of the door sash. A corner bracket is provided at the corner portion. A glass guide is provided along the rear end of the corner bracket so as to guide the front edge portion of the door window. A weather strip provided along the door sash to establish a seal between the door sash and the door window has a glass guide portion which extends to an external peripheral edge portion of the door window from an internal peripheral edge portion thereof, and extends to the front end of the corner bracket along the door sash. And, core material is embedded, adjacent the rear edge portion of the door glass, in the glass guide portion of the weather strip so as to reinforce the glass guide portion.

25 Claims, 11 Drawing Sheets (A)

(B)

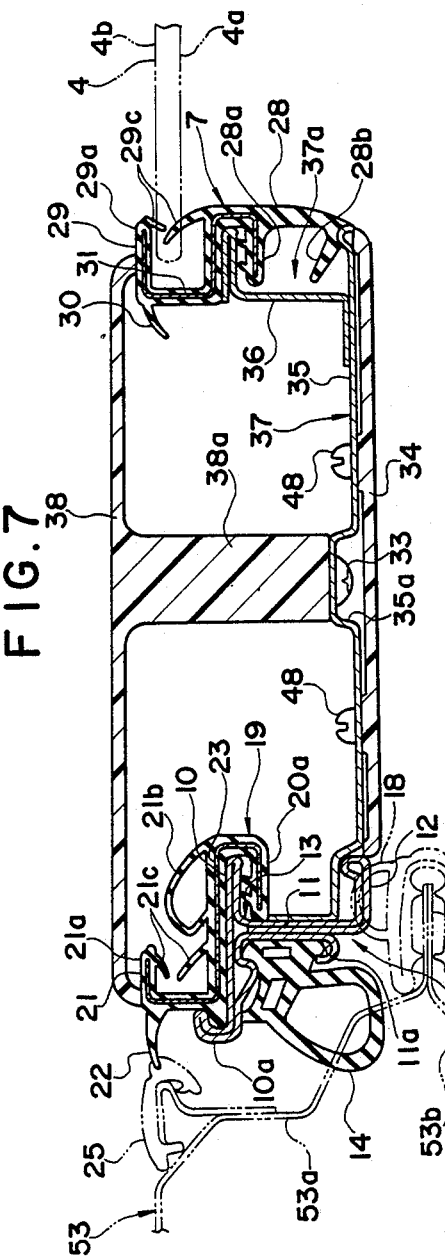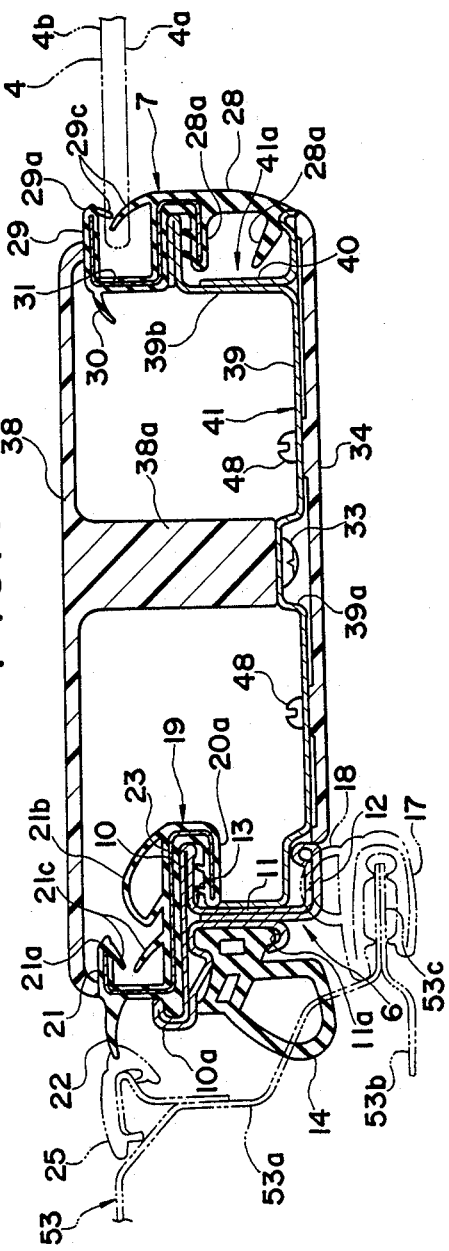

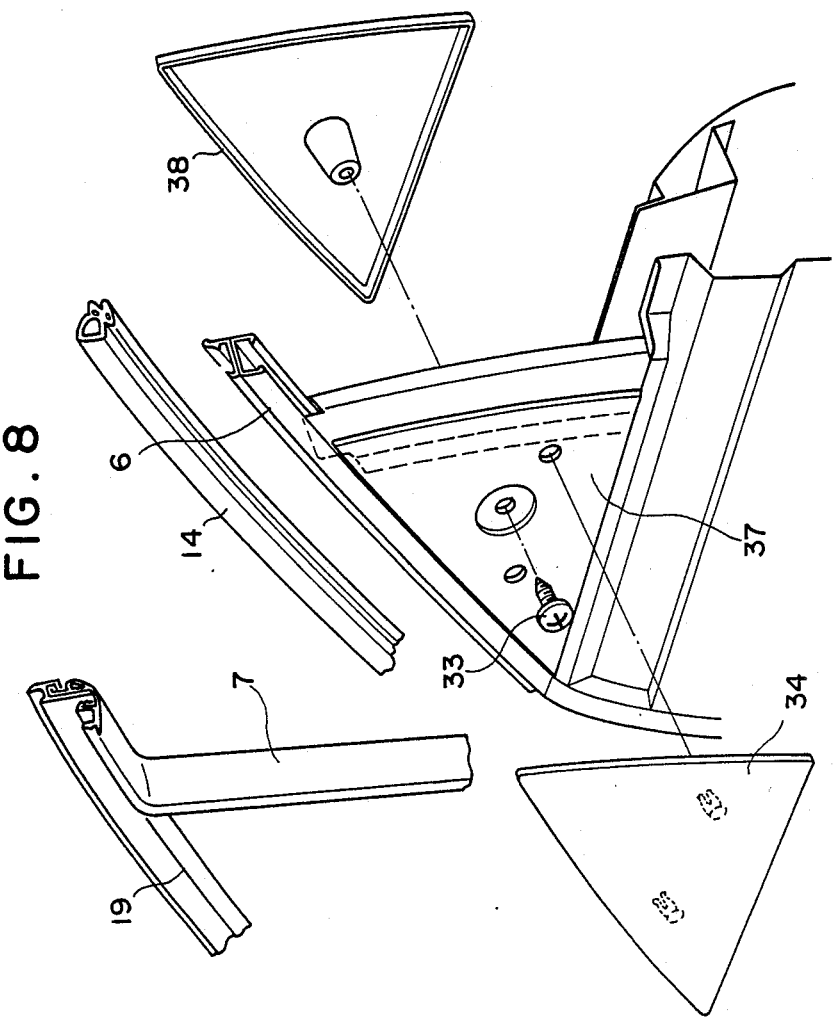

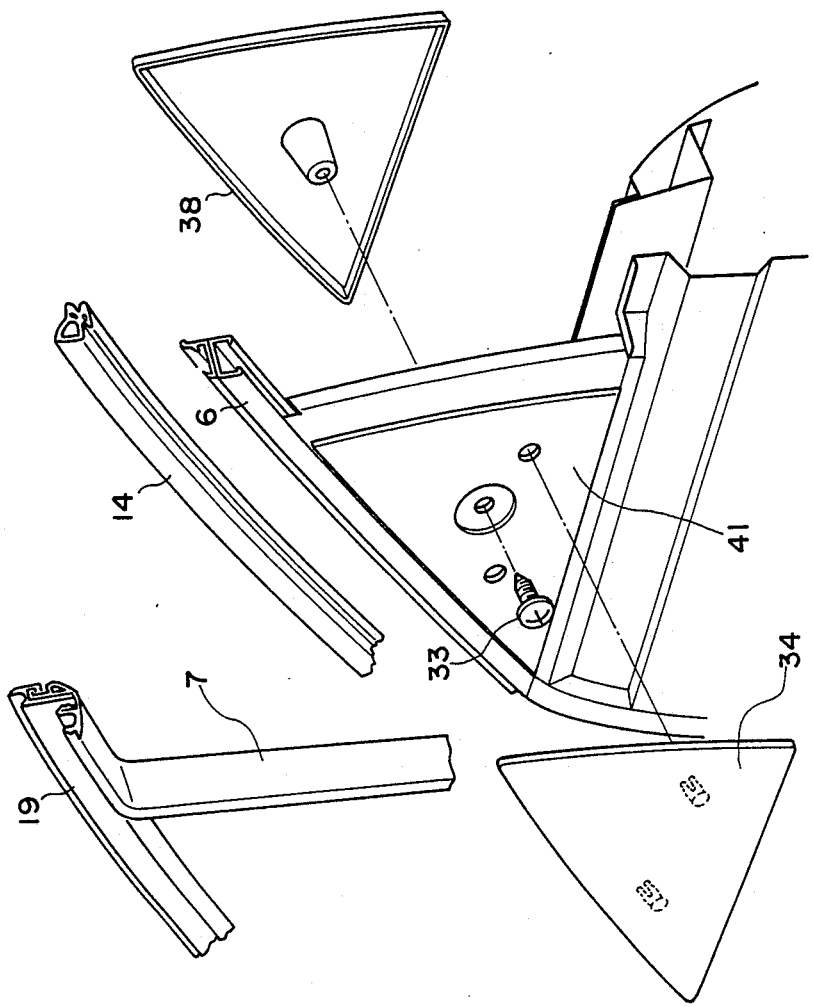

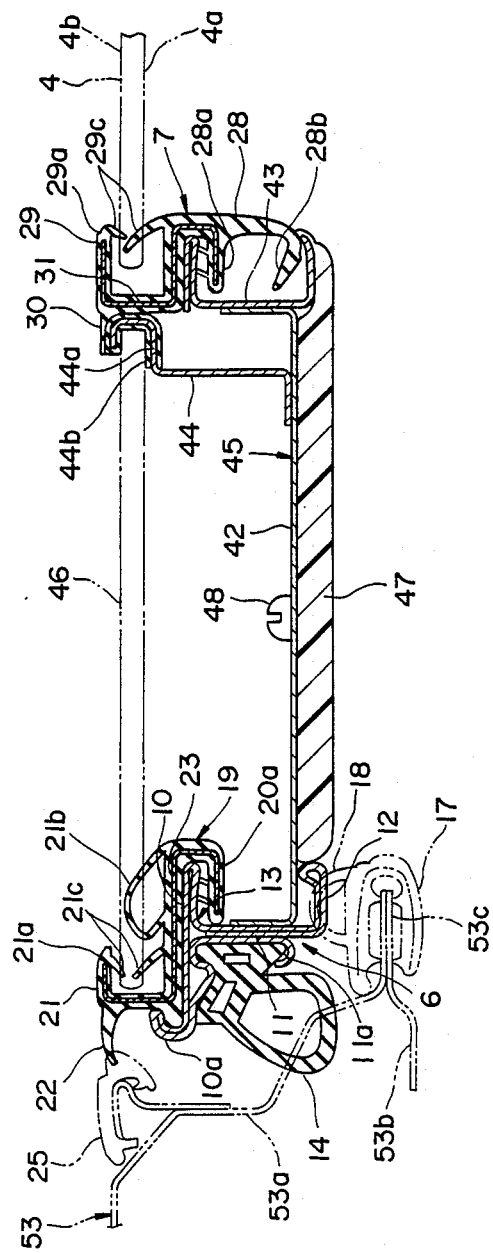

DOOR STRUCTURE OF VEHICLE

BACKGROUND OF THE INVENTION

1. Field of the Invention

The present invention relates to a door structure of a vehicle which can form a flush surface.

2. Description of the Prior Art

In the field of vehicles, particularly automobiles, it has been recently attempted to remove step portions from the outer surface of a car body as much as possible to form a so-called flush surface so as to enhance the aerodynamic characteristics. As door structure to realize the flush surface, an inner sash is known in which each vertically movable door window is arranged to the outside of a door sash extending upward from a main body of the door, as disclosed in Japanese Laid-Open Utility Model No. 114012 (1985).

In the above-mentioned door structure, since the door sash is positioned in a compartment, a guide mechanism for guiding the door glass is provided so as not to impair the external appearance and to make the vertical movement of the door window smooth. For the guide mechanism of the door window, a flange portion of the door sash is utilized, and the mechanism is composed of the flange portion and a guide shoe which is arranged to slide along the flange portion on the side of the inner face of the door window. Between the door window and the door sash, a seal is provided by a weather strip independently disposed at the door sash.

However, in the above-mentioned conventional structure, since the flange portion is necessary for the door sash, there is required a trim panel for covering the flange portion to exhibit an aesthetic appearance. Moreover, it is also required to fix the guide shoe to the inner face of the door window in the structure. The guide shoe must be attached to the door window with sufficient attachment strength. Thus a stopper is used which engages the guide shoe through the door window from the outer face thereof. Accordingly, since the stopper is exposed at the outer face of the door window, the external appearance of the door is impaired. Furthermore, the weather strip which is provided along the door sash in order to form a seal between the door window and the door sash is easily deformed because it comprises a flexible material. The deformation of the weather strip causes the external appearance to be impaired. Moreover, there occurs a relatively large space between the guide shoe and the door sash which causes problems in that wind-generated noise tends to be heard in the compartment during traveling of the vehicle to impair the quietness in the compartment, etc. Additionally, the external appearance around a corner portion defined by the door sash and the main body of the door is inferior.

SUMMARY OF THE INVENTION

In order to solve these problems, the present invention is characterized by comprising a door body of a car capable of opening and closing, and defining the inside and outside of a passenger compartment; a door sash provided at the upper portion of the door body to form a window space; a door window provided movably in the vertical direction on the door sash outwardly of the compartment for opening and closing the window space; a corner portion defined by the door sash and the door body at the front end portion of the door sash; a corner bracket provided at the corner portion to close the corner portion; a glass guide provided at the front end portion of the door sash and extending vertically along the rear end portion of the corner bracket for guiding the front edge portion of the door window vertically; a weather strip provided at the door sash to seal a space between the door sash and the door window, having a glass guide portion which extends to an external peripheral edge portion of the door window from an internal peripheral edge portion thereof, and extending to the front end portion of the corner bracket along the door sash which terminates at the front end portion of the corner bracket; and core material embedded, adjacent the edge of the door window, in the glass guide portion of the weather strip so as to reinforce the portion.

In the above-mentioned structure, the stiffness of the weather strip is enhanced by embedding the core material in the glass guide portion thereof. Thus the weather strip has a guiding function and a sealing function with respect to the door window. Accordingly, the rear edge portion and the front edge portion of the door window are respectively guided by the glass guide portion of the weather strip and the glass guide provided at the rear edge portion of the corner bracket, so that the door window can be moved smoothly in the vertical direction. Thus, it is unnecessary to independently provide another guide mechanism for the door window, and the problem of the external appearance being impaired by the guide mechanism can be solved. Moreover, since the core material is embedded in the glass guide portion of the weather strip, deformation of the weather strip hardly occurs thereby also contributing to the improved external appearance. Furthermore, since the guide of the door window and the seal between the door window and the door sash are effected by the weather strip without providing another guide mechanism, the space formed between the door glass and the door sash when the door window is closed is slight, so that the wind-generated noise during traveling of the vehicle is hardly heard in the compartment.

Since the front end portion of the door sash extends forward along the front edge portion of the corner bracket, and the weather strip extends forward along the door sash, it becomes possible to arrange the weather strip continuously along, for example, a drip molding without any deformation therein. And in particular, the external appearance of the corner portion at which is provided the corner bracket can be improved.

The weather strip may comprise an elastic member, and the core material may comprise a metal.

Moreover, the core material may extend as embedded in the glass guide portion to a location adjacent the outer peripheral portion of the door window adjacent the edge thereof from an internal peripheral portion of the door window adjacent the edge thereof.

The door sash may be composed of an extending portion connected to the rear end portion of the door body and extending vertically upward therefrom, and an upper frame portion which extends forward and substantially horizontally from the upper end portion of the extending portion, and further extends forward and downward in an inclined attitude, and the front end portion of which is connected to the front end portion of the door body to form the corner portion between the front end portion of the upper frame portion and the door body. Moreover, the weather strip may be disposed to extend from the extending portion of the door sash along the upper frame portion to the front end portion of the upper frame portion of the door sash.

Furthermore, the car body may be formed with a panel body, and the weather strip may establish a seal between the door sash and the panel body adjacent to the door sash when the door body is closed.

The weather strip may include an attachment portion to be attached to the door sash, a glass run channel portion for guiding the vertical movement of the rear edge portion of the door window, and a lip portion defining a sealing face. The glass run channel portion of the weather strip may form an outer surface guide portion for guiding the door window by extending from the internal surface of the door window to the external surface thereof so that the peripheral portion of the door window is surrounded and held by the glass run channel portion. Further, the core material may be embedded in the weather strip so as to extend from the outer surface guide portion of the glass run channel portion to the attachment portion. Further, the glass run channel portion of the weather strip may have a water cut-off seal portion in slidable contact with the glass surface of the door window.

The panel body may comprise a front pillar, a center pillar and a roof rail which define a door space which is selectively opened and closed by the door body. To the front pillar and the roof rail is attached a drip molding, and to the center pillar is attached a trim panel for covering the exterior of the center pillar. Further, the lip portion of the weather strip is disposed in substantially the same plane as the outer surface guide portion of the glass run channel portion, and the lip portion is in contact with the door sash, trim panel and drip-molding so as to cover a space between such when the door body is closed. Moreover, a seaming welt may be attached to the front pillar, center pillar and roof rail, respectively. At the seaming welt is another weather strip in contact with the door sash to as to establish a seal. Additionally, the door sash may have another weather strip which establishes a seal between the door sash and the front pillar, center pillar and roof rail when the door body is closed.

The glass guide may be provided at the corner bracket and may comprise an elastic member.

Further, a core material may be embedded in the glass guide. The core material may be a core metal. Moreover, the glass guide may comprise a weather strip having an attachment portion, a glass run channel portion for guiding the front edge portion of the door window and a lip portion. And, the glass run channel portion has an opening which opens toward the window space and is arranged at the external surface of the corner bracket.

A covering member for covering the external surface of the corner bracket may be provided thereon. The corner bracket may be a closed cross-sectional structure. Moreover, the corner bracket may comprise an outer panel and an inner panel with the front edge portions of the panels being connected to each other and jointed to the front end portion of the door sash, and an auxiliary frame connecting the rear edge portions of these panels. The outer panel, inner panel and auxiliary frame collectively form a closed cross-sectional structure and the covering member extends from a front edge portion thereof at the weather strip to a rear edge portion thereof at the glass guide so as to close the space between the weather strip and the glass guide. And, a trim panel is attached to the internal surface of the inner panel.

The corner bracket may comprise a main panel and an auxiliary frame, and the front edge portion of the main panel is attached to the door sash, while the rear edge portion thereof forms a channel portion together with the auxiliary frame. To the channel portion is attached the glass guide, and a covering member is attached to the external surface of the main panel.

The corner bracket may also comprise a main panel, an auxiliary frame and a support frame. The front edge portion of the main panel is attached to the door sash, and to the rear edge portion of the main panel is attached the auxiliary frame. And the support frame has a channel portion which faces the glass run channel portion of the weather strip, adjacent the glass guide. The channel portion is covered by a covering member, and between the channel portion and the glass run channel portion is provided a glass plate. A trim panel is attached to the internal surface of the main panel.

Further, the corner bracket may comprise an outer panel, an inner panel and an auxiliary frame. The front edge portion of the outer panel is connected to the inner panel, and the front edge portion of the inner panel is attached to the door sash, further, the rear edge portions of these panels are connected to each other through the auxiliary frame to form a closed cross-sectional structure. At the external surface of the outer panel is provided a covering member, and the front edge portion of the covering member is inserted into the glass run channel portion of the weather strip, while the rear edge portion thereof is in contact with the lip portion of the glass guide. A trim panel is attached to the internal surface of the inner panel.

BRIEF DESCRIPTION OF THE DRAWINGS

FIG. 5 is a cross-sectional view taken along line C—C in FIG. 2(A) illustrating a first example of a corner bracket portion, FIG. 7 is a cross sectional view taken along line C—C in FIG. 2(A) illustrating a second example of the corner bracket portion, FIG. 8 is an exploded perspective view of the structure of FIG. 7, FIG. 9 is a cross-sectional view taken along line C—C in FIG. 2(A) illustrating third example of the corner bracket portion, FIG. 10 is an exploded perspective view of the structure of FIG. 9, FIG. 11 is a cross sectional view taken along line C—C in FIG. 2(A) illustrating a fourth example of the corner bracket portion.

DETAILED DESCRIPTION OF THE PREFERRED EMBODIMENTS

(Embodiment 1)

A first embodiment of the present invention will be described below referring to FIGS. 1 to 6.

Figure 1:
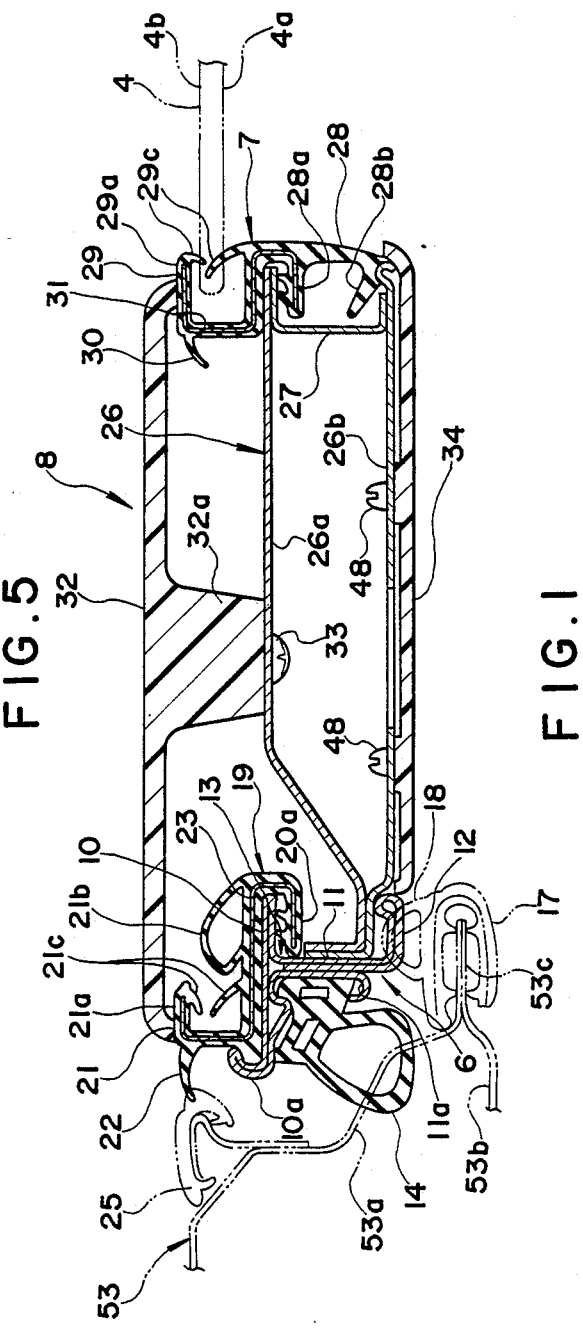
FIG. 1 is a perspective view of an automobile which is equipped with a door structure of a vehicle according to the invention.

An automobile as a vehicle is provided with front doors 2 and rear doors 3 at its body 1 as shown in FIG. 1. Both the doors 2 and 3 are of a so-called inner-sash type where, as will be described below, door sashes 6 are provided on the inner side of door windows 4.

The front door 2 has a main door body 5 which is composed of a panel, as shown in FIG. 2(A). Above the main door body 5 is provided a door sash 6 which forms a window space. The door sash 6 comprises an extending portion 6a which is connected to the main door body 5 near the rear end portion of main door body 5 and extends upward, and an upper frame portion 6b which extends forward and substantially horizontally from the upper end portion of the extending portion 6a, and further extends forward and downward and is connected to the main door body 5 near the front end portion of main door body 5. At a front portion of the upper frame portion 6b is vertically arranged an auxiliary frame 27 extending from the door sash 6 into the main door body 5 disposed therebelow. At a corner portion 8 which is formed by the auxiliary frame 27, a corner bracket 26 is provided. A first weather strip 19 extends from the extending portion 6a of the door sash 6 along the upper frame portion 6b to the front end portion of the door sash 6 as shown in FIG. 2(B). Moreover, a glass guide 7 for guiding the front edge portion of the door window 4 extends along the auxiliary frame 27. Accordingly, the door sash 6 extends along the upper edge portion of the corner bracket 26 substantially up to the front end portion of the main door body 5, and the glass guide 7 extends vertically along the rear edge portion of the corner bracket 26. At the corner portion 8, a door mirror 9 is attached as shown in FIG. 1.

Figure 3:
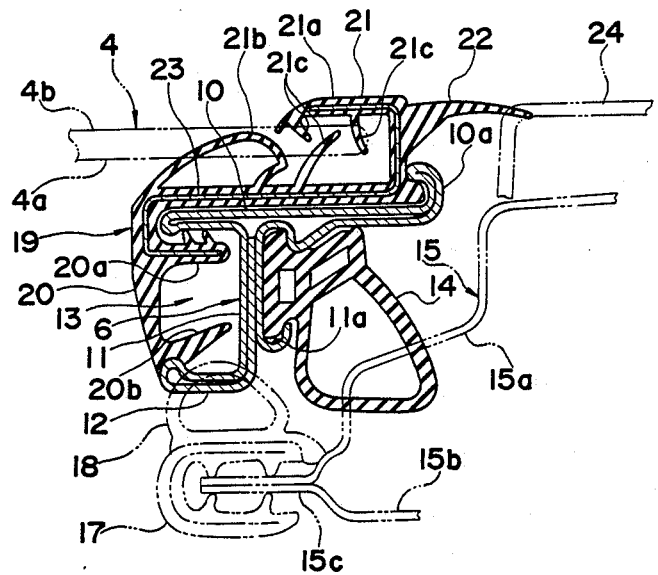
FIG. 3 is a cross-sectional view taken along line A—A in FIG. 2(A)
Figure 4:
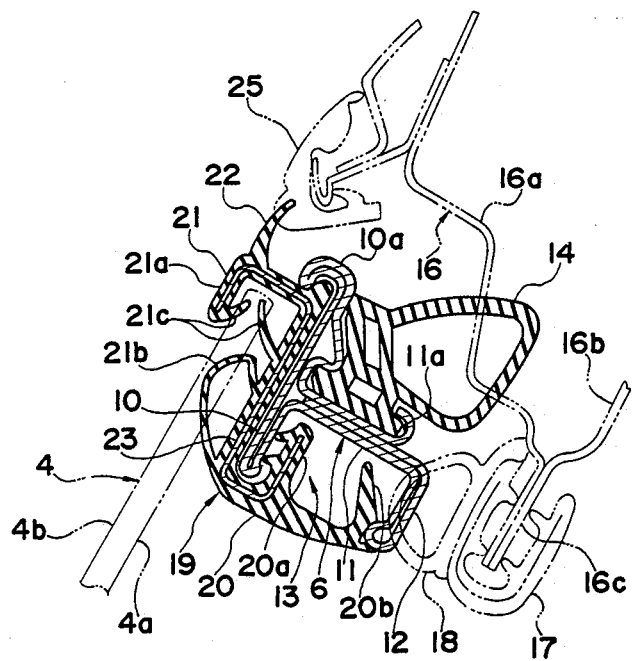
FIG. 4 is a cross-sectional view taken along line B—B in FIG. 2(A)

As shown in FIGS. 3 and 4, respectively, the extending portion 6a and the upper frame portion 6b of the door sash 6 have a facing portion 10 which faces the inner face 4a of the door window 4, a crossing portion 11 which extends toward the compartment laterally from the central portion of the facing portion 10, and a bending portion 12 which extends toward the window space substantially perpendicularly from an end portion of the crossing portion 11 on the side of the compartment. A part of the facing portion 10 on the side of the window space, the crossing portion 11 and the bending portion 12 form a U-shaped cross-sectional portion 13 which opens toward the window space.

Figure 6:
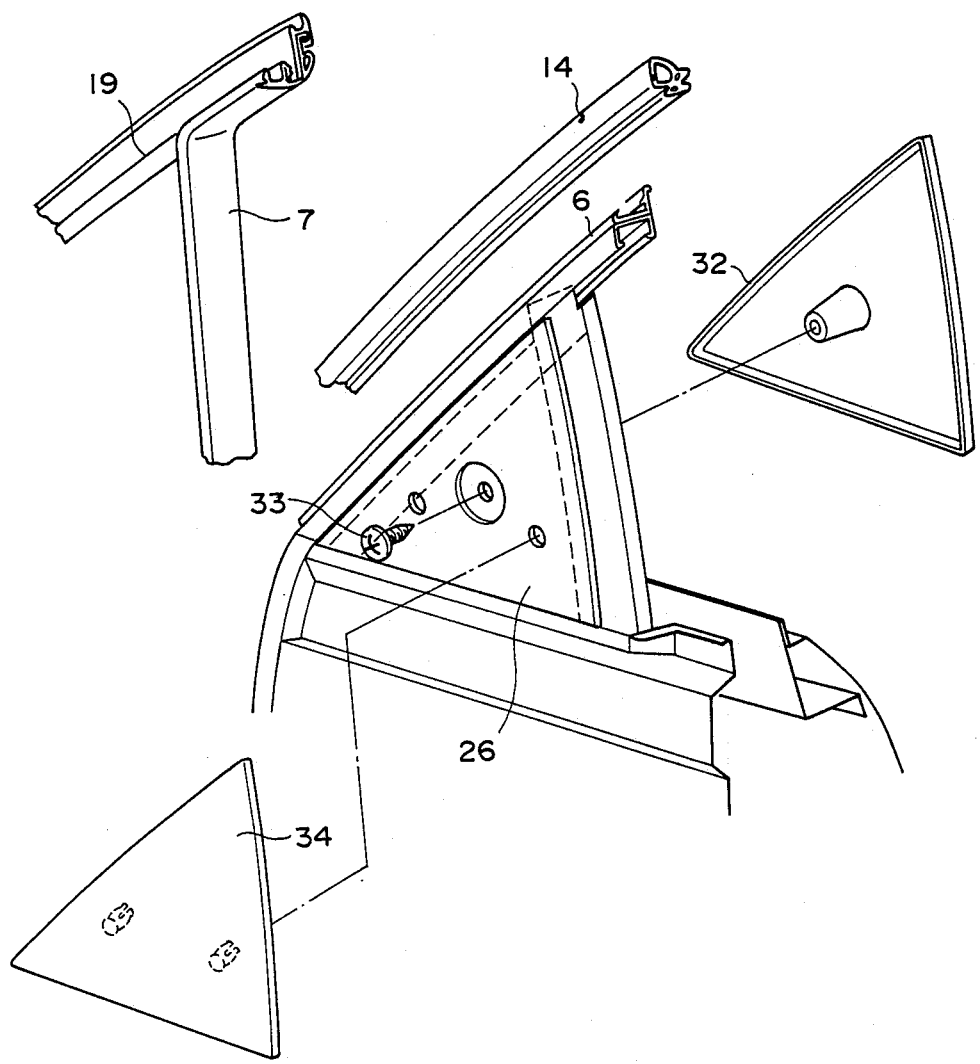
FIG. 6 is an exploded perspective view of the structure of FIG. 5.

Formed opposite to the U-shaped cross-sectional portion 13 is a weather strip fitting portion 11a, and in the weather strip fitting portion 11a is fitted a second weather strip 14. The second weather strip 14 is constructed such that it may seal, when the front door 2 is closed, a space between the door sash 6 and a center pillar 15 comprising an outer panel 15a and an inner panel 15b as shown in FIG. 3, a space between the door sash 6 and a roof rail 16 comprising an outer panel 16a and an inner panel 16b as shown in FIG. 4, and a space between the door sash 6 and a front pillar 53 comprising an outer panel 53a and an inner panel 53b as shown in FIGS. 5 and 6. Around a joint portion 15c of the outer panel 15a and inner panel 15b in the center pillar 15, a joint portion 16c of the outer panel 16a and inner panel 16b in the roof rail 16, and a joint portion 53c of the outer panel 53a and inner panel 53b in the front pillar 53 is respectively fitted a seaming welt 17. At the seaming welt 17, a third weather strip 18 is integrally provided, and the third weather strip 18 is in contact with the bending portion 12 of the door sash 6 so as to aid in the prevention of the penetration of water between the door sash 6 and the car body 1.

Further, a fitting portion 10a is formed at the end of the facing portion 10 of the door sash 6 on the side of the center pillar 15 or the roof rail 16. The first weather strip 19 is fitted in the fitting portion 10a and the U-shaped cross-sectional portion 13 so as to be attached to the door sash 6. The first weather strip 19 has a holding portion 20 which is fitted in the U-shaped cross-sectional portion 13, a glass run channel portion 21 (hereinafter called GRC portion) which is a glass guide for guiding the door window 4 vertically and a lip portion 22. The lip portion 22 is in contact with a pillar trim panel 24 which covers the outer surface of the center pillar 15, and a drip-molding 25 which is attached to the roof rail 16 and the front pillar 53, so that it may cover, when the front door 2 is closed, a space between the door sash 6 and the pillar trim panel 24 or the drip-molding 25.

The holding portion 20 has a first projecting portion 20a which extends toward the inside of the U-shaped cross-sectional portion 13 along the facing portion 10 of the door sash 6, and a second projecting portion 20b which extends along the bending portion 12. The GRC portion 21 extends toward the fitting portion 10a from the holding portion 20 along the facing portion 10 of the door sash 6, and forms an outer face guide portion 21a by curving slightly toward the outer face 4b of the door window 4 so as to hold the peripheral part of the door window 4 therebetween. The GRC portion 21 has a hollow and ridgy water cut-off portion 21b and a plurality of projecting/plate-like water cut-off portions 21c. With respect to the GRC portion 21 of the first weather strip 19 in the upper frame portion 6b of the door sash 6 as shown in FIG. 4, a guiding function of the door window 4 is not so important, and thus it is possible that the length of the outer face guide portion 21a at the upper frame portion 6b be shorter than that at the extending portion 6a so that the number of the water cut-off portions 21c is reduced. However, since the outer face 4b of the door window 4 is under negative pressure during travel, it is necessary for the GRC portion 21 in the upper frame portion 6b to have a guiding function that can at least prevent the door window 4 from being pulled out by the negative pressure. The lip portion 22 is provided at the GRC portion 21, and extends in substantially the same plane as the outer face guide portion 21a in the opposite direction to the outer face guide portion 21a.

In the first weather strip 19 is embedded core material comprising a piece of sheet metal 23 extending from the outer face guide portion 21a of the GRC portion 21 to the first projecting portion 20a of the holding portion 20. With this, stiffness is given to the GRC portion 21 and a part of the holding portion 20, so that the GRC portion 21 can be provided to function as a glass guide of the door window 4 and the first weather strip 19 can be secured with a high attachment strength to the door sash 6.

Figure 2:
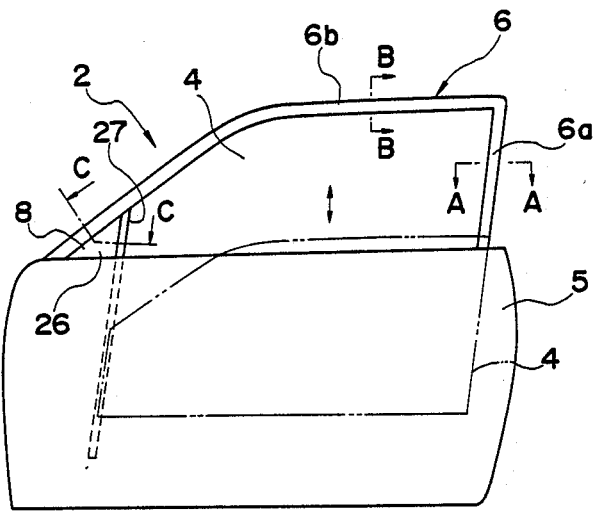
FIG. 2(A) is a front view of the front door.
FIG. 2(B) is a view illustrating the disposition of a weather strip and a glass guide in the front door.
Figure 2:
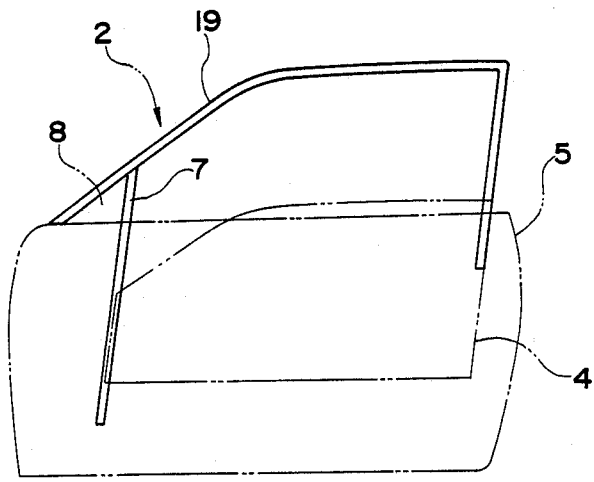

As discussed above, at the above-mentioned corner portion 8, as shown in FIG. 2, the corner bracket 26 is provide. As shown in FIGS. 5 and 6, the corner bracket 26 comprises an outer panel 26a, inner panel 26b and auxiliary frame 27 which has a U-shaped cross section. The front edge portions of the outer panel 26a and the inner panel 26b are connected to each other, and further bent to connect to the U-shaped cross sectional portion 13 of the door sash 6, and the rear edge portions thereof are connected to each other through the auxiliary frame 27. The front portion of the outer panel 26a is bent toward the side of the inner panel 26b so as to guarantee a space in which the first weather strip 19 is attached to the door sash 6. Accordingly, the corner bracket 26 has a closed cross-sectional shape formed by the cross-sections of the outer panel 26a, inner panel 26b and auxiliary frame 27. Incidentally, the holding portion 20 of the first weather strip 19 at the corner portion 8 has a form in which only the first projecting portion 20a remains and the other portions thereof are cut away so that the front edge portion of the corner bracket 26 can be inserted into the weather strip fitting portion 11a of the door sash 6.

Around the auxiliary frame 27 is fitted the glass guide 7 comprising a weather strip. The glass guide 7 has, similarly to the first weather strip 19, a holding portion 28, a GRC portion 29 having a U-shaped cross section for guiding the front edge portion of the door window 4, and a lip portion 30. The holding portion 28 has a first projecting portion 28a and a second projecting portion 28b. The GRC portion 29 is provided at the outer face of the outer panel 26a so as to open toward the window space for guiding the door window 4. The GRC portion 29 has an outer face guide portion 29a and water cut-off portions 29c. In the glass guide 7 is embedded a core of metal 31 extending from the outer face guide portion 29a of the GRC portion 29 to the first projecting portion 28a of the holding portion 28, and thus the glass guide 7 has stiffness sufficient to guide the door window 4.

At the outer face of the outer panel 26a of the corner bracket 26, a trim panel 32 is provided. The trim panel 32 has an attaching convex portion 32a which is formed near the central portion of the inner face thereof, and the attaching convex portion 32a is fixed at the outer panel 26a with a screw 33. The front edge of the trim panel 32 is located at the outer face of the outer face guide portion 21a of the GRC portion 21 of the first weather strip 19, while the rear edge portion thereof is located at the outer face of the outer face guide portion 29a in the GRC portion 29 of the glass guide 7, and thus the trim panel 32 covers an opening defined between the first weather strip 19 and the glass guide 7. In this case, at the outer panel 26a of the corner bracket 26, a mirror base may be arranged instead of the trim panel 32. Further, at the inner face of the inner panel 26b is attached another trim panel 34 which covers the inner face.

In the above-mentioned structure, the rear edge portion and the upper edge portion of the door window 4 are guided by the GRC portion 21 of the first weather strip 19, and the front edge portion thereof is guided by the glass guide 7 which is provided independently, and thus the door window 4 can be moved smoothly in the vertical direction. Moreover, at the portion corresponding to the extending portion 6a and the upper frame portion 6b of the door sash 6, a core metal 23 is embedded in the GRC portion 21 having a U-shaped cross section of the first weather strip 19, so that stiffness at that portion is enhanced to make it possible for the GRC portion 21 to guide the door window 4. Accordingly, it becomes unnecessary to independently provide another guide mechanism for the door window 4. Moreover, in selecting the shape of the door sash 6, it is not required to consider any restriction on the guide mechanism, and the disadvantage that the external appearance is impaired by providing the guide mechanism is eliminated. Further, the guide of the door window 4 and the seal between the door window 4 and the door sash 6 are effected by the first weather strip 19 and the glass guide 7 without providing another guide mechanism for the door window 4. Thus, a space which occurs between the door window 4 and the door sash 6 when the door window 4 is closed is slight, and the wind-generated noise during traveling is hardly heard in the passenger compartment. Accordingly, the quietness in the compartment is improved.

Since the core metal 23 is embedded in the GRC portion 21 of the first weather strip 19, deformation of the portion hardly occurs, thereby also improving the external appearance. Further, since the door sash 6 extends along the corner bracket 26 substantially up to the front end portion of the main door body 5, and the first weather strip 19 extends along the door sash 6 substantially up to the front end portion of the main body 5, it is possible to make the first weather strip 19 extend along the drip-molding 25 in a constant and continuous state without changing its external appearance. Accordingly, the external appearance, particularly that around the corner portion 8, can be improved. Moreover, since the corner bracket 26 has a closed cross-sectional structure, it exhibits good strength.

(Embodiment 2)

A second embodiment of the present invention will be described below referring to FIGS. 7 and 8. For the convenience of the description, the same members as shown in the drawings of Embodiment 1 are indicated by the same numerals or characters, and the detailed description thereof will be omitted.

A door structure of a vehicle according to this embodiment has a corner bracket 37 comprising a main panel 35 and an auxiliary frame 36 at a corner portion 8 as shown in FIGS. 7 and 8. The front edge portion of the main panel 35 is bent and connected to a U-shaped cross-sectional portion 13 of a door sash 6. The auxiliary frame 36 is connected to a rear portion of the main panel 35 and forms a U-shaped cross-sectional portion 37a together with the main panel 35. A glass guide 7 is fitted in the U-shaped cross-sectional portion 37a. At the outer face of the main panel 35 is provided a trim panel 38. An attachment convex portion 38a of the trim panel 38 is fixedly mounted with a screw 33 to a convex portion 35a of the main panel 35 which projects toward the outside of the car.

In the above-mentioned structure, the corner bracket 37 is a one-plate structure so to be simple. Accordingly, with such a structure, a car body 1 can be lightened and its cost can be reduced.

Similar to Embodiment 1, a guide mechanism becomes unnecessary, the external appearance can be improved because deformation of a GRC portion 21 of a first weather strip 19 hardly occurs, the wind-generated noise during traveling is hardly heard in the compartment, and the external appearance around the corner portion 8 can be improved.

(Embodiment 3)

A third embodiment of the present invention will be described below referring to FIGS. 9 and 10. For the convenience of the description, the same members as shown in the drawings of Embodiment 1 are indicated by the same numerals or characters, and the detailed description thereof will be omitted.

A door structure of a vehicle according to this embodiment has a corner bracket 41 comprising a main panel 39 and an auxiliary frame 40 at a corner portion 8. Namely, similar to the structure described in Embodiment 2, the corner bracket 41 is a one-plate structure thereby simplifying the structure. In this embodiment, the shapes of the main panel 39 and the auxiliary frame 40 are different from those of the above-mentioned main panel 35 and the auxiliary frame 36. More specifically, the auxiliary frame 40 is substantially L-shaped, and forms a U-shaped cross-sectional portion 41a for receiving a glass guide 7 therein together with an L-shaped portion 39b at a rear portion of the main panel 39. Similarly, a trim panel 38 is attached to a convex portion 39a of the main panel 39 with a screw 33.

Similar to Embodiment 1, a guide mechanism becomes unnecessary, the external appearance can be improved because deformation of a GRC portion 21 of a first weather strip 19 hardly occurs, the wind-generated noise during traveling of the vehicle is hardly heard in the compartment, and the external appearance around the corner portion 8 can be improved.

(Embodiment 4)

Figure 12:
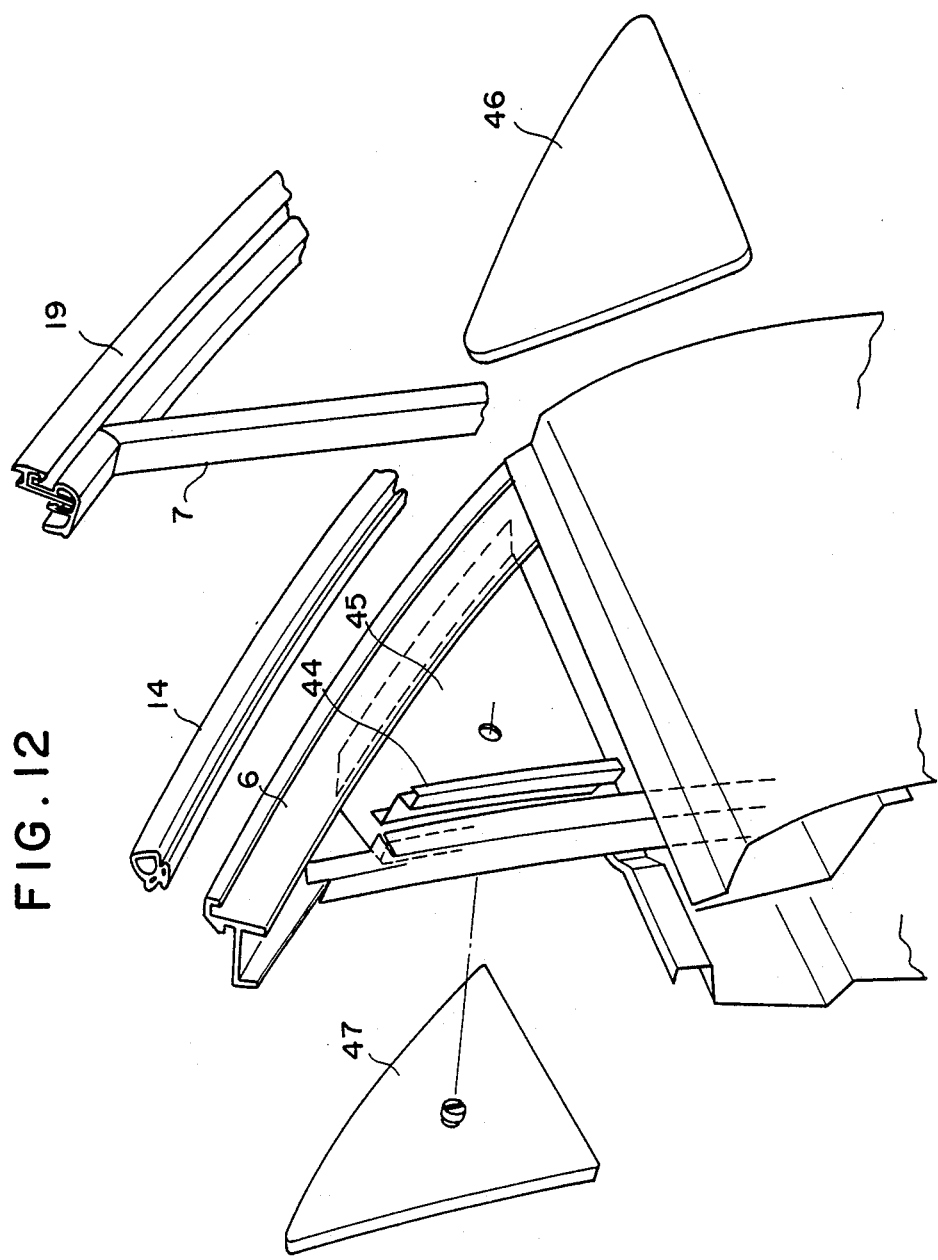
FIG. 12 is an exploded perspective view of the structure of FIG. 11.

A fourth embodiment of the invention will be described below with reference to FIGS. 11 and 12. For the convenience of the description, the same members as shown in the drawings of Embodiment 1 are indicated by the same numerals or characters, and the detailed description thereof them will be omitted.

A door structure of a vehicle according to this embodiment has a corner bracket 45 comprising a main panel 42, an auxiliary frame 43 and support frame 44 at a corner portion 8 thereof. The front edge portion of the main panel 42 is bent and connected to a U-shaped cross-sectional portion 13 of a door sash 6. The auxiliary frame 43 has a U shaped cross section in which is fitted a glass guide 7, and is connected to a rear portion of the main panel 42. The support frame 44 has a holding portion 44a having a U-shaped cross section for holding a glass plate 46 at the outer portion thereof. The holding portion 44a is arranged at the inner side of a lip portion 30 of the glass guide 7 is covered with a covering member 44b. The glass plate 46 as an accessory is held by the holding portion 44a of the support frame 44 and a GRC portion 21 of a first weather strip 19. At the inner face of the main panel 42 is secured a trim panel 47 with a screw 48.

In the above-mentioned structure, the corner bracket 45 is a one-plate structure so as to be simple, and an outer face guide portion 21a and a lip portion 22 of the GRC portion 21 of the first weather strip 19 extend continuously even over the corner portion 8. Moreover, since the glass plate 46 is arranged in the same plane as the door window 4 at the corner portion 8, the continuity of the door window 4 with the corner portion 8 exists so that the external appearance can be improved. Thus, the structure is suitable for achieving a flush surface. It should be noted that instead of the glass plate 46, a trim panel or a mirror base may be provided.

Similar to Embodiment 1, a guide mechanism becomes unnecessary, the external appearance can be improved because deformation of the GRC portion 21 of the first weather strip 19 hardly occurs, the wind-generated noise during traveling is hardly heard in the compartment, and the external appearance around the corner portion 8 can be improved.

(Embodiment 5)

Figure 13:
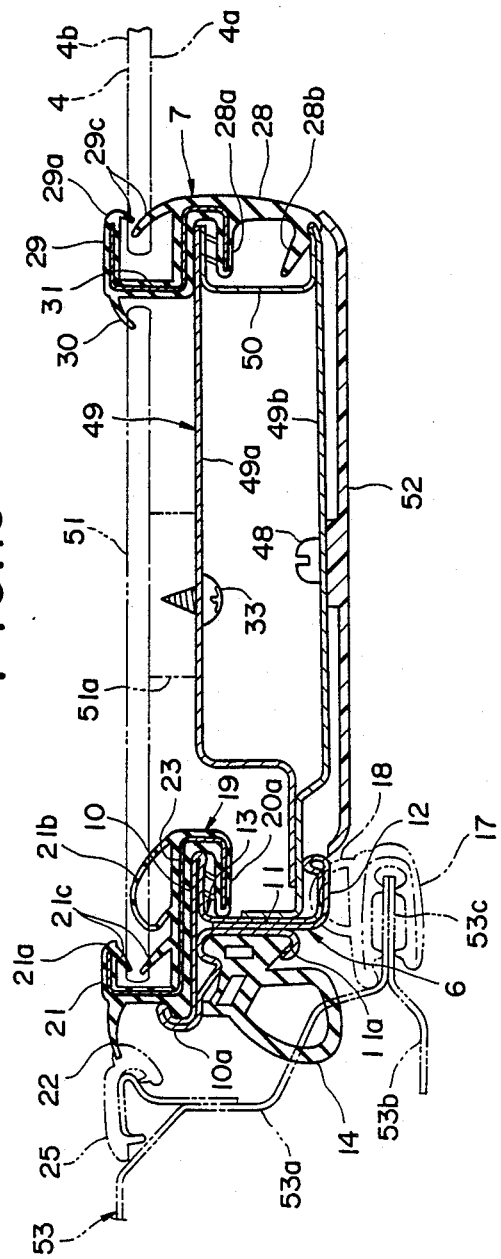
FIG. 13 is a cross sectional view taken along line C—C in FIG. 2(A) illustrating a fifth example of the corner bracket portion, and FIG. 14 an exploded perspective view to show the structure of FIG. 13.
Figure 14:
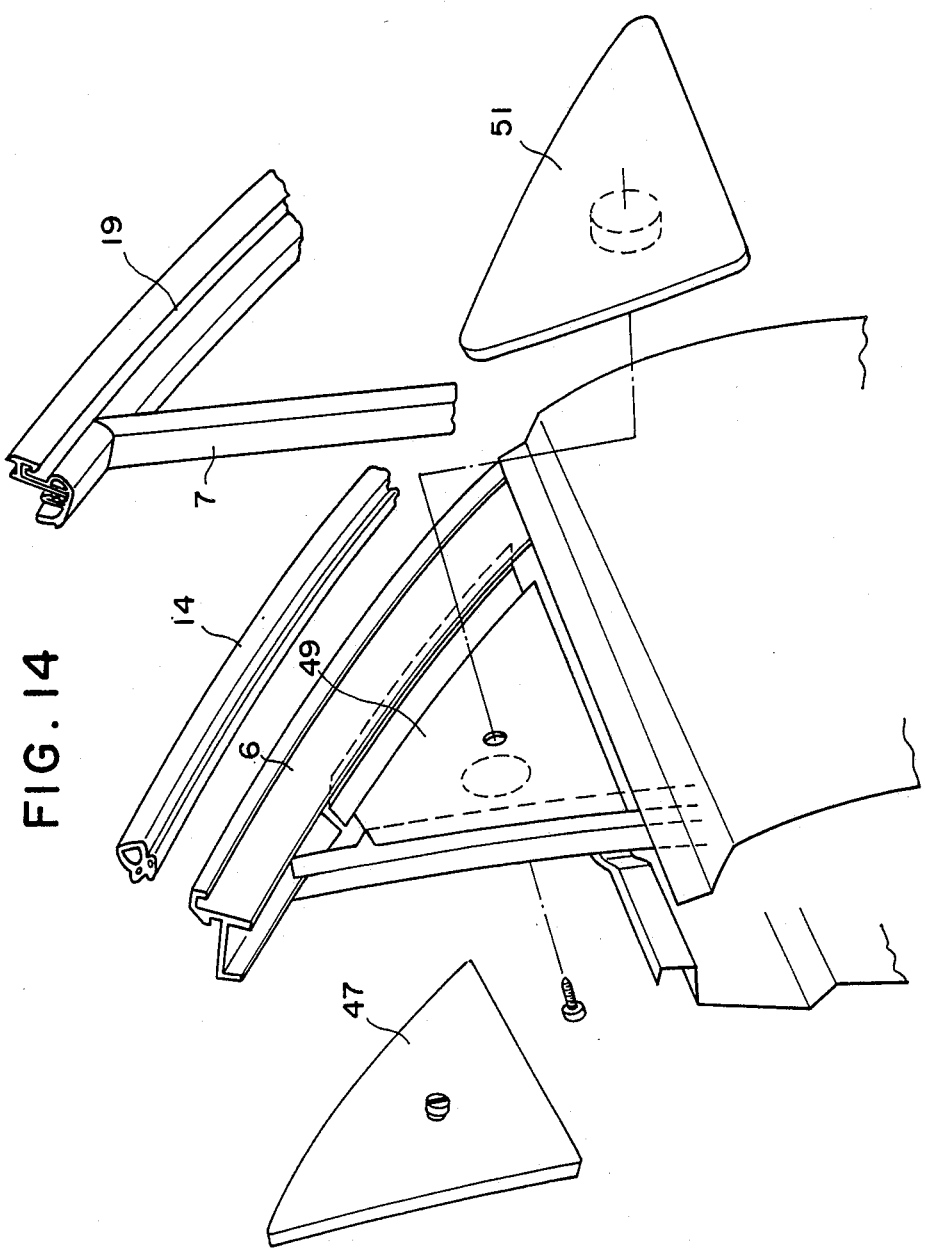

A fifth embodiment of the present invention will be described below in accordance with FIGS. 13 and 14. For the convenience of the description, the same members as shown in the drawings of Embodiment 1 are indicated by the same numerals or characters, and the detailed description thereof will be omitted.

A door structure of a vehicle according to this embodiment has a corner bracket 49 comprising an outer panel 49a, an inner panel 49b, and an auxiliary frame 50 having a U-shaped cross section at a corner portion 8. The front edge portion of the outer panel 49a is connected to a front portion of the inner panel 49b, and the front edge portion of the inner panel 49b is bent and connected to a U-shaped cross-sectional portion 13 of a door sash 6. The rear edge portions of both panels 49a, 49b are connected to each other through the auxiliary frame 50.

At the outer face of the outer panel 49a is provided a trim panel 51. The trim panel 51 has an attachment convex portion 51a near the central portion of the rear face thereof, and the attachment convex portion 51a is fixed to the outer panel 49a with a screw 33. The front edge portion of the trim panel 51 is inserted into a GRC portion 21 of a first weather strip 19, and the rear edge portion thereof is disposed at the inner side of a lip portion 30 of a glass guide 7. To the inner face of the inner panel 49b is attached a trim panel 52 by a screw 48.

In the above-mentioned structure the corner bracket 49 has a closed cross-sectional structure, thereby exhibiting a high degree of strength. Furthermore, since an outer face guide portion 21a and a lip portion 22 of the GRC portion 21 of the first weather strip 19 extend continuously even over the corner portion 8, and since the trim panel 51 is arranged in the same plane as the door window 4, similar to Embodiment 4, a continuity of the door window 4 with the corner portion 8 exists so that the external appearance can be improved, thereby achieving a flush surface. It should be noted that, instead of the trim panel 51, a mirror base may be provided.

Similar to Embodiment 1, a guide mechanism becomes unnecessary, the external appearance can be improved because deformation of the GRC portion 21 of the first weather strip 19 hardly occurs, wind-generated noise during traveling of the vehicle is hardly heard in the compartment, and the external appearance around the corner portion 8 is improved.

As mentioned above, the door structure of vehicle according to the present invention has a structure in which a vertically movable door window is arranged to the outside of a door sash forming a window space above a main door body, at the door sash is provided a weather strip for establishing a seal between the door sash and the door window, and a corner bracket is provided at a corner portion which is formed by the door sash and the main door body at an end portion of the door sash, wherein the weather strip has a glass guide portion which extends to an outer face peripheral edge portion of the door from an inner face peripheral edge portion thereof, in the glass guide portion a core material is embedded, the front end portion of the door sash extends forward along the upper edge portion of the corner bracket, the weather strip extends forward along the door sash, and another glass guide for guiding the front edge portion of the door window extends vertically along the rear edge portion of the corner bracket.

Therefore, since the glass guide portion of the weather strip functions as a glass guide, it is not necessary to provide an additional guide mechanism for the door window, and deformation of the weather strip hardly occurs. Accordingly, the trouble of providing such a guide mechanism is obviated, the number of parts is reduced, and the external appearance is improved. Moreover, a restriction on the selection of the shape of the door sash is eliminated. A space to be formed between the door window and the door sash when the door window is closed is slight. Thus the wind-generated noise during traveling is hardly heard in the compartment thereby contributing to the quietness of the compartment. Moreover, it becomes possible to arrange the weather strip along, for example, a molding on the side of a car body in a constant and continuous state, so that it becomes possible to improve the external appearance around the corner portion in particular.

What is claimed is:

1. Door structure for opening and closing the passenger compartment of a vehicle having a car body in which the passenger compartment is defined, said door structure comprising a door body; a door sash connected to said door body at front and rear upper portions thereof and forming a window space above the door body; a door window mounted in the door body so as to be disposed outwardly of said door sash with respect to the passenger compartment and so as to be vertically movable relative to the door body to open and close said window space, said door window terminating at an edge thereof; a corner bracket disposed at and covering a corner portion of the window space defined at the location at which said door sash is connected to the front upper portion of said door body, said corner bracket having a front end portion confronting said door sash at the location at which said door sash is connected to the front upper portion of said door body and a rear end portion confronting said door window; a glass guide extending vertically from said door sash along the rear end portion of said corner bracket, said glass guide guiding said door window at a front portion of the edge of said door window during vertical movement of the door window; a weather strip secured to said door sash and establishing a seal between said door sash and said door window, said weather strip defining a glass guide extending at a rear portion of the edge of said door window from an inner peripheral portion of said door window adjacent the edge thereof to an outer peripheral portion of said door window adjacent the edge thereof, and said weather strip extending along said sash over the front end portion of said corner bracket; and core material embedded in the glass guide portion of said weather strip at the rear portion of the edge of said door window, said core material reinforcing said glass guide portion.

2. Door structure of a vehicle according to claim 1, wherein the weather strip comprises an elastic material.

3. Door structure of a vehicle according to claim 1, wherein the core material is a metal.

4. Door structure of a vehicle according to claim 1, wherein said core material extends, as embedded glass guide portion, to a location adjacent the outer peripheral portion of the door window from a location adjacent the internal peripheral portion of the door window.

5. Door structure of a vehicle according to claim 1, wherein said door sash comprises an extending portion connected to the rear upper portion of the door body and extending upwardly therefrom and an upper frame portion which extends forward and substantially horizontally from an upper end of the extending portion, and which upper frame portion further extends forward and downward with an inclined attitude to a front end thereof, the front end of said upper frame portion being connected to the front upper portion of said door body, and the corner bracket being disposed between the front end of said upper frame portion and said door body.

6. Door structure of a vehicle according to claim 5, wherein said weather strip extends from the extending portion of said door sash to the front end of the upper frame portion of said door sash.

7. Door structure of a vehicle according to claim 1 and in which vehicle the car body is formed of panels, wherein said weather strip establishes a seal between the door sash and the car body formed of panels when the door body is closed.

8. Door structure of a vehicle according to claim 7, wherein said weather strip includes an attachment portion attached to said door sash, a glass run channel portion defining the glass guide for guiding the rear portion of the edge of the door window and a lip portion having a sealing face at the exterior of the door body.

9. Door structure of a vehicle according to claim 8, wherein the glass run channel portion of said weather strip has an outer surface guide portion which is an external portion of the glass run channel portion curved toward the door window so that the peripheral portion of the door window adjacent the edge thereof is surrounded and held by the glass run channel portion.

10. Door structure of a vehicle according to claim 9, wherein said core material embedded in the weather strip extends from the outer surface guide portion of said glass run channel portion to said attachment portion.

11. Door structure of a vehicle according to claim 9 and in which vehicle the panels comprise a front pillar, a center pillar and a roof rail which define a space selectively opened or closed by the door body, a drip-molding is attached to the front pillar and the roof rail, and a trim panel is attached to the center pillar and covers the exterior of the center pillar, and wherein the lip portion of the weather strip is disposed in substantially the same plane as the outer surface guide portion of the glass run channel portion and is in contact with said door sash, said trim panel and said drip-molding so as to cover a space defined between the door sash, the trim panel and the drip-molding when the door body is closed.

12. Door structure of a vehicle according to claim 11, further comprising a seaming welt attached to the front pillar, the center pillar and the roof rail, respectively, and another weather strip attached to the seaming welt, said another weather strip being in contact with said door sash and establishing a seal between said seaming welt, the front pillar, the center pillar and the roof rail.

13. Door structure of a vehicle according to claim 11, further comprising another weather strip attached to said door sash and establishing a seal between said door sash and the front pillar, the center pillar and the roof rail when the door body is closed.

14. Door structure of a vehicle according to claim 8, wherein the glass run channel portion of the weather strip has a water cut-off seal in sliding contact with said door window.

15. Door structure of a vehicle according to claim 8, wherein said corner bracket comprises a main panel, an auxiliary frame and a support frame, a front portion of said main panel is attached to said door sash, said auxiliary panel is attached to a rear portion of said main panel, and said support frame defines a channel facing the glass run channel portion of said weather strip and extending along said glass guide, and further comprising a cover member covering the channel, a glass plate extending between the channel and the glass run channel portion of said weather strip, and a trim panel attached to the internal surface of said main panel.

16. Door structure of a vehicle according to claim 8, wherein said glass guide has an attachment portion at which the guide is attached to said corner bracket, a glass run channel portion guiding the front portion of the edge of said door window, and a lip portion extending opposite said attachment portion, said corner bracket comprises an outer panel, an inner panel and an auxiliary frame, a front portion of said outer panel is attached to said inner panel, a front portion of said inner panel is attached to said door sash, rear portions of said inner and said outer panel are connected to each other through the auxiliary frame and form a closed cross-sectional structure, and further comprising a covering member at the external surface of said outer panel, a front edge of the covering member being disposed within the glass run channel portion of said weather strip and a rear edge thereof contacting the lip portion of said glass guide inwardly therefrom with respect to the compartment, and a trim panel attached to the internal surface of said inner panel.

17. Door structure of a vehicle according to claim 1, wherein said glass guide is secured to the corner bracket.

18. Door structure of a vehicle according to claim 17, wherein the corner bracket is a closed cross-sectional structure.

19. Door structure of a vehicle according to claim 17, wherein said glass guide comprises an elastic member.

20. Door structure of a vehicle according to claim 19, wherein core material is embedded in said glass guide.

21. Door structure of a vehicle according to claim 20, wherein the core material is metal.

22. Door structure of a vehicle according to claim 20, wherein said glass guide comprises a weather strip including an attachment portion at which the weather strip of said glass guide is secured to said corner bracket, a glass run channel portion guiding the front portion of the edge of said door window and a lip portion extending opposite said attachment portion, the glass run channel portion defining an opening which is open toward the window space at the exterior of said corner bracket.

23. Door structure of a vehicle according to claim 17, further comprising a covering member covering the external surface of said corner bracket.

24. Door structure of a vehicle according to claim 23, wherein the corner bracket comprises an outer panel an an inner panel having front portion s connected to each other and jointed to a front end portion of said door sash, and an auxiliary frame which connects rear portions of said inner and said outer panels to one another, said outer panel, said inner panel and said auxiliary frame collectively forming a closed cross-sectional structure, and said covering member extending from a front edge portion thereof located at said weather strip to a rear edge portion thereof located at said glass guide so as to cover a space between the weather strip and the glass guide, and further comprising a trim panel attached to the internal surface of said inner panel.

25. Door structure of a vehicle according to claim 23, wherein said corner bracket comprises a main panel and an auxiliary frame, a front portion of said main panel is attached to said door sash, and a rear portion of said main panel defines a channel with said auxiliary frame, said glass guide being attached to the corner bracket within said channel, and said covering member being attached to the external surface of said main panel.

* * * * *